UNITED STATES PATENT OFFICE.

WILLIAM HARROLD SMITH, OF CHICAGO, ILLINOIS.

PREPARING COTTON FOR TRANSPORTATION.

SPECIFICATION forming part of Letters Patent No. 247,126, dated September 13, 1881.

Application filed July 22, 1881. (Specimens.)

*To all whom it may concern:*

Be it known that I, WILLIAM HARROLD SMITH, of Chicago, Cook county, State of Illinois, have invented certain new and useful Improvements in Preparing Cotton for Transportation, of which the following is a specification.

My invention relates to bales of cotton.

Heretofore it has been usual to compress cotton into bales in suitable presses, the bale being surrounded with strong baling-ties while still under the power of the press, to prevent its expanding and falling to pieces the moment it is removed therefrom. Such bales usually weigh from ten to twelve pounds per cubic foot. It has also been customary to subject these bales, as they come from the plantation, to still further compression, by which their density is increased to from twenty to thirty pounds per cubic foot, before exporting them or transporting them to any great distance. These condensed bales are very expansible, and serious injury is sometimes occasioned to workmen by bursting of the baling-ties in subsequently handling such bales.

I have discovered that by subjecting cotton or cotton waste to compression by percussion in a suitable mold or press until it is reduced to a density of from forty to eighty pounds per cubic foot, using for this purpose, preferably, a powerful steam-hammer, the particles of cotton will be deprived of their natural resiliency, and the block or bale of cotton, when afterward removed from the mold or press, will practically retain the size and form imparted to it by the hammer and mold without being surrounded by any baling-ties to keep it from expanding. Such blocks or bales of cotton are in suitable condition for shipment when removed from the mold, and it is not necessary to surround them with ties or covering, as the particles of cotton composing such block or bale self-cohere together in a solid compressed block of sufficient strength and tenacity to withstand ordinary usage and handling. However, I prefer to inclose them in a paper or other covering to protect the cotton from exposure.

In describing my improved bale or block of cotton I have used the term "self-cohering" to express the fact that the particles of cotton forming said block cohere together in a solid mass without the agency of any baling or binding ties surrounding it, and without the addition of any adhesive admixtures of any kind.

The cotton may be reduced into my improved bales or blocks as it comes fresh from the gin on the plantation; or the ordinary bale of cotton may be thus treated.

Besides the much diminished bulk of my improved bales or blocks and the increased convenience in handling, transportation, and storage, and the saving in baling-ties, which may be completely dispensed with, my improved bales or blocks of cotton have another important advantage over the ordinary bales, in that the air is practically excluded from the cotton, owing to the dense compact nature of the block, so that the cotton will lose little or none of the natural oils which it contains when it comes from the gin, and which it in a great measure loses when put up in ordinary bales. This is an advantage of great importance and value in the subsequent manufacture of the cotton.

My improved blocks may, of course, be made cylindrical or square, as preferred, according to the shape of the mold or press, and of any desired size and weight. If they are made square, there is some additional saving in the space required to pack or store them. If they are made cylindrical, there is some additional convenience in handling, especially in the case of very heavy blocks. I prefer usually to make them cylindrical and of about four hundred pounds weight.

Cotton waste in cotton-manufactories may be made into similar bales.

The block of cotton may be inclosed in a paper covering and an outer canvas bag, both of which coverings may be used, if preferred. The paper covering may be simply a sheet of paper wrapped around the block.

I claim—

As a new article of commerce, the self-cohering solid block of cotton compressed by concussion, substantially as specified.

WILLIAM HARROLD SMITH.

Witnesses:
T. EVERETT BROWN,
H. M. MUNDAY.